United States Patent
Utermoehlen et al.

(10) Patent No.: US 10,386,205 B2
(45) Date of Patent: Aug. 20, 2019

(54) LINEAR TRAVEL MEASUREMENT APPARATUS FOR A COMPRESSION TRAVEL OF A TELESCOPIC SPRING UNIT, AND CORRESPONDING TELESCOPIC SPRING UNIT

(71) Applicant: Robert Bosch GmbH, Stuttgart (DE)

(72) Inventors: Fabian Utermoehlen, Leonberg (DE); Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 15/276,358

(22) Filed: Sep. 26, 2016

(65) Prior Publication Data

US 2017/0089731 A1    Mar. 30, 2017

(30) Foreign Application Priority Data

Sep. 28, 2015 (DE) .................. 10 2015 218 554

(51) Int. Cl.
*G01D 5/20* (2006.01)
(52) U.S. Cl.
CPC ................................ *G01D 5/2006* (2013.01)
(58) Field of Classification Search
CPC ..... G01D 5/00; G01D 5/12; G01D 5/20–2291
See application file for complete search history.

(56) References Cited

U.S. PATENT DOCUMENTS

| | | | | |
|---|---|---|---|---|
| 4,987,783 A * | 1/1991 | D'Antonio | ............. | A61H 31/00 331/181 |
| 5,279,163 A * | 1/1994 | D'Antonio | ............. | A61B 5/087 336/30 |
| 5,419,563 A * | 5/1995 | Abrams | ............. | A63B 69/3632 473/202 |
| 6,668,668 B1 * | 12/2003 | Peshkin | ............. | B66C 13/18 324/207.15 |
| 7,816,911 B2 * | 10/2010 | Taylor | ............. | G01D 3/036 324/207.15 |
| 8,164,325 B2 * | 4/2012 | Niwa | ............. | G01D 5/202 324/207.12 |
| 8,590,395 B2 * | 11/2013 | Ge | ............. | G01F 1/28 73/861.11 |

(Continued)

FOREIGN PATENT DOCUMENTS

DE    10 2007 017 308 B4    10/2008

*Primary Examiner* — Huy Q Phan
*Assistant Examiner* — David B Frederiksen
(74) *Attorney, Agent, or Firm* — Maginot, Moore & Beck LLP

(57) ABSTRACT

A linear travel measurement apparatus for a compression travel of a telescopic spring unit includes an electrically conductive spring. A telescopic spring unit includes a linear travel measurement apparatus of this kind. The spring is configured to form a measurement inductance, which is dependent on an effective length of the spring. The spring has a respective electrical contact at each of its ends and is connected to a measurement capacitance and to an evaluation and control unit by corresponding electrical connections. The measurement inductance forms an electrical LC resonant circuit with the measurement capacitance, the evaluation and control unit are configured to measure the resonant frequency of said LC resonant circuit, and the resonant frequency is given as a function of the compression travel.

11 Claims, 4 Drawing Sheets

(56) References Cited

U.S. PATENT DOCUMENTS

| | | | |
|---|---|---|---|
| 2003/0179003 A1* | 9/2003 | Toda | G01D 3/028 324/679 |
| 2005/0121994 A1* | 6/2005 | Kong | H01R 39/385 310/239 |
| 2008/0277848 A1* | 11/2008 | Davis | B62K 25/08 267/217 |
| 2009/0085733 A1* | 4/2009 | Gandhi | B60C 23/006 340/443 |
| 2011/0132078 A1* | 6/2011 | Wu | G01N 3/08 73/81 |
| 2012/0303193 A1* | 11/2012 | Gresser | B60G 17/0157 701/22 |
| 2013/0119728 A1* | 5/2013 | Schmitt | B60N 2/54 297/217.3 |
| 2014/0306940 A1* | 10/2014 | Fukushima | G06F 1/1626 345/179 |
| 2015/0123940 A1* | 5/2015 | Park | G06F 3/0416 345/174 |
| 2016/0363475 A1* | 12/2016 | Bedetti | G01G 19/44 |

\* cited by examiner

LINEAR TRAVEL MEASUREMENT APPARATUS FOR A COMPRESSION TRAVEL OF A TELESCOPIC SPRING UNIT, AND CORRESPONDING TELESCOPIC SPRING UNIT

This application claims priority under 35 U.S.C. § 119 to patent application number DE 10 2015 218 554.0, filed on Sep. 28, 2015, the disclosure of which is incorporated herein by reference in its entirety.

BACKGROUND

The disclosure proceeds from a linear travel measurement apparatus for a compression travel of a telescopic spring unit described herein. A corresponding telescopic spring unit described herein is also a subject matter of the present disclosure.

Externally fitted measurement systems are known from the prior art for detecting a linear travel in a system which is spring-mounted by means of a telescopic spring arrangement, such as in a motorcycle suspension fork for example. Said measurement systems measure the linear travel or the insertion depth of the suspension fork with the aid of a potentiometer and a sliding contact. Disadvantages of this can be considered to include firstly the wear of the measurement system and secondly the exposed position on the outside of the slider tube which can lead to soiling and accordingly to reduced reliability of the measurement system.

Furthermore, MacPherson spring legs which are used, for example, for wheel suspension in motor vehicles are known from the prior art. Here, measurement of the compression can be performed, for example, by means of relatively expensive pressure force sensors.

DE 10 2007 017 308 B4 discloses a spring unit comprising a linear travel sensor which ascertains the changes in distance between two spring turns. Furthermore, the total compression travel is then deduced. The linear travel sensor used is based in one embodiment on the "coupled-coils" principle, that is to say a target on the spring changes the inductive coupling between two sensor coils. In a second embodiment, the target is of resonant design and comprises a resonant circuit. However, measurement of the inductive coupling remains substantially identical.

SUMMARY

The linear travel measurement apparatus for a compression travel of a telescopic spring unit having the features described herein and also the corresponding telescopic spring unit having the features described herein have the advantage that the inductance of the spring which acts as an electrical coil itself is used as the measurement inductance. The measurement inductance of the spring, which measurement inductance changes during compression, is then evaluated in order to determine the compression travel. This allows cost-effective measurement of the compression travel of the spring without an additional sensor system.

Embodiments of the disclosure directly measure the compression travel by means of the change in inductance, which change is caused by compression of the spring, and a measurement capacitance by means of the resonant frequency of the corresponding resonant circuit in which the spring represents the measurement inductance. This means that embodiments of the disclosure ascertain and evaluate the resonant frequency of the resonant circuit which is formed by the spring itself and a capacitor.

Embodiments of the present disclosure provide a linear travel measurement apparatus for a compression travel of a telescopic spring unit comprising an electrically conductive spring. The spring forms a measurement inductance which is dependent on an effective length of the spring. Here, the spring has a respective electrical contact at its ends and is connected to a measurement capacitance and to an evaluation and control unit by means of corresponding electrical connections. The measurement inductance forms an electrical LC resonant circuit with the measurement capacitance, the evaluation and control unit measuring the resonant frequency of said LC resonant circuit, wherein the resonant frequency is given as a function of the compression travel.

The disclosure also proposes a telescopic spring unit comprising a linear travel measurement apparatus of said kind for a compression travel, a stanchion tube, a slider tube, a support tube and an electrically conductive spring which is arranged within the stanchion tube and is tensioned between the stanchion tube and the support tube. The stanchion tube is mounted in an axially movable manner with respect to the support tube and the slider tube, wherein, during compression, the stanchion tube enters the slider tube against the force of the spring and compresses the spring.

In the present case, the evaluation and control unit can be understood to mean an electrical device, such as a control device for example, which processes and/or evaluates detected measurement signals. The evaluation and control unit can have at least one interface which can be hardware-based and/or software-based. In the case of a hardware-based design, the interfaces can be, for example, part of a so-called system ASIC which contains an extremely wide variety of functions of the evaluation and control unit. However, it is also possible for the interfaces to be dedicated, integrated electrical circuits or to at least partially comprise discrete components. In the case of a software-based design, the interfaces can be software modules which are provided, for example, on a microcontroller in addition to other software modules. Also advantageous is a computer program product with program code, which is stored on a machine-readable medium such as a semiconductor memory, a hard disk or an optical memory and is used to carry out the evaluation when the program is run by the evaluation and control unit.

Advantageous improvements to the linear travel measurement apparatus, which is specified in the following description, for a compression travel of a telescopic spring unit and to the telescopic spring unit, which is specified in the following description, are possible owing to the measures and developments set out in the following description.

It is particularly advantageous that the evaluation and control unit can calculate a current compression travel on the basis of the measured resonant frequency of the LC resonant circuit.

In an advantageous refinement of the linear travel measurement apparatus, components of the telescopic spring unit form the electrical connections and/or the measurement capacitance. As a result, in an advantageous, no additional components apart from the electronic components of the evaluation and control unit are required for measuring the resonant frequency and for calculating the linear travel.

Embodiments of the linear travel measurement apparatus can be integrated directly into the telescopic spring unit, so that, in an advantageous manner, soiling of and/or damage to and/or theft of components of the linear travel measurement apparatus are/is not possible. Furthermore, a wear-free and cost-effective linear travel measurement apparatus which is distinguished by a very high degree of reliability can be provided.

In an advantageous refinement of the telescopic spring unit, the measurement capacitance can be formed between two surfaces of the slider tube and of the stanchion tube, which surfaces face one another, and can be dependent on an insertion depth of the stanchion tube in the slider tube. The support tube can be of electrically conductive design and can be guided through an electrically insulated bushing in the slider tube. In addition, the slider tube can be of electrically conductive design, wherein the surfaces of the slider tube and of the stanchion tube can be electrically insulated from one another by means of a sealing ring. Furthermore, the stanchion tube and the support tube can be electrically insulated from one another.

In a further advantageous refinement of the telescopic spring unit, the spring can be electrically conductively connected to the stanchion tube by means of a first electrical contact and can be electrically conductively connected to the support tube by means of a second electrical contact. In addition, the evaluation and control unit can be electrically conductively connected to the slider tube by means of a first contact element and can be electrically conductively connected to the support tube by means of a second contact element.

An exemplary embodiment of the disclosure is illustrated in the drawing and will be explained in greater detail in the following description. In the drawing, like reference symbols denote components or elements which execute the same or similar functions.

DETAILED DESCRIPTION

Figure 1:
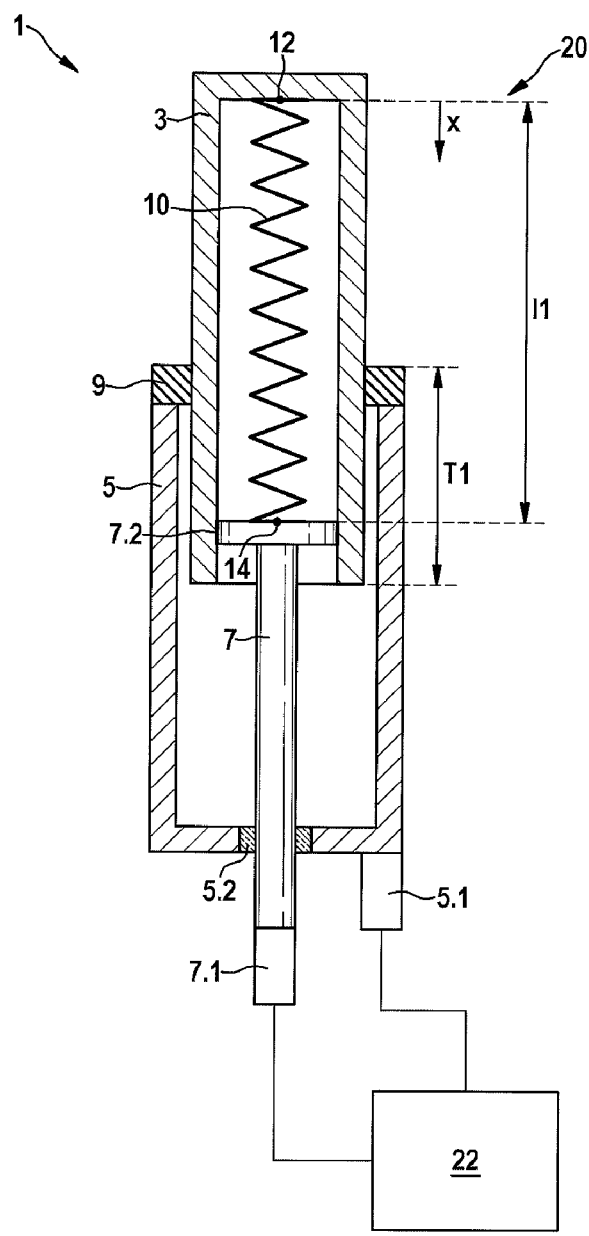
FIG. 1 is a schematic illustration of an exemplary embodiment of a telescopic spring unit in a no-load position comprising a linear travel measurement apparatus according to the disclosure for a compression travel of the telescopic spring unit.
Figure 2:
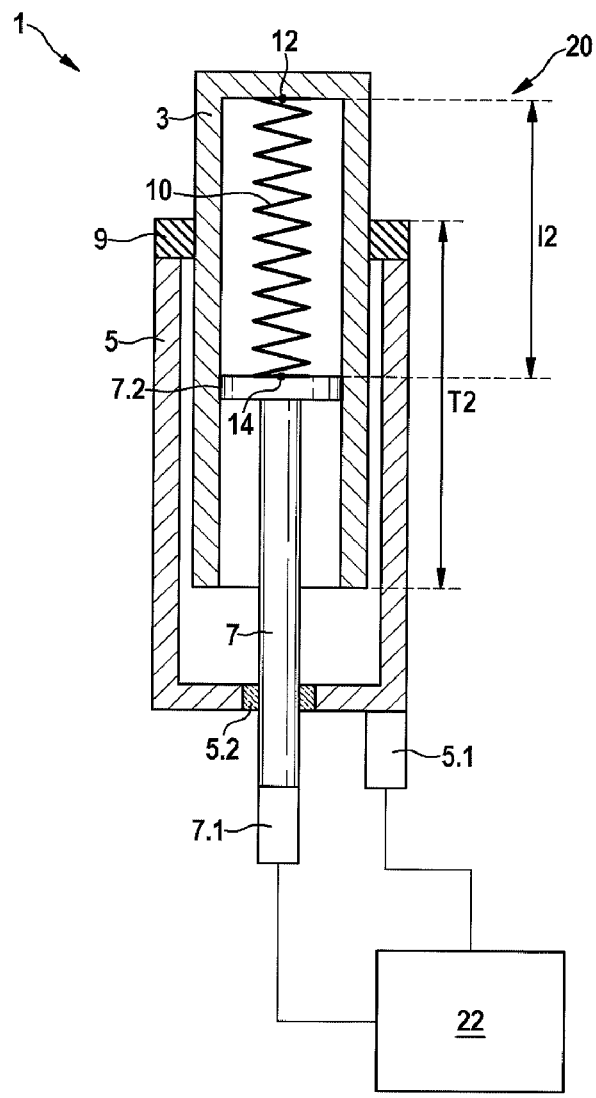
FIG. 2 is a schematic illustration of the telescopic spring unit from FIG. 1 in a compressed position.
Figure 3:
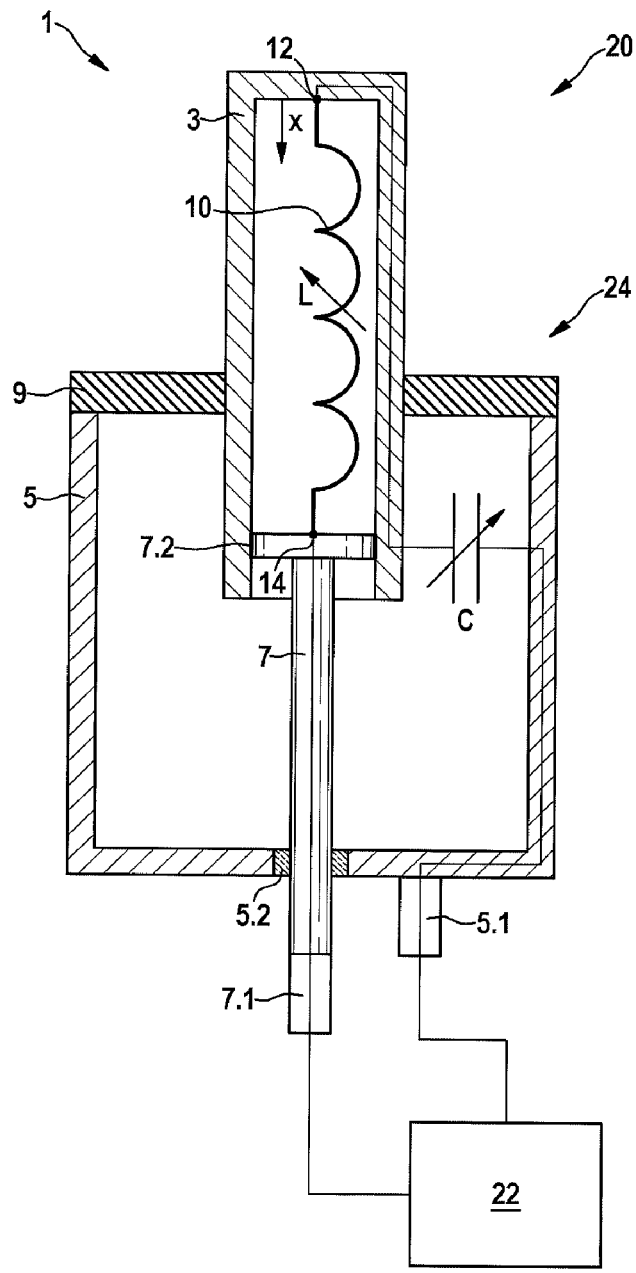
FIG. 3 is a schematic illustration of the telescopic spring unit from FIG. 1 with electrical contact connection and equivalent circuit elements of the linear measurement apparatus.

As is shown in FIGS. 1 to 3, the illustrated exemplary embodiment of a telescopic spring unit 1 according to the disclosure comprises a linear travel measurement apparatus 20 for a compression travel x, a stanchion tube 3, a slider tube 5, a support tube 7 and an electrically conductive spring 10 which is arranged within the stanchion tube 3 and is tensioned between the stanchion tube 3 and the support tube 7. The stanchion tube 3 is mounted in an axially movable manner with respect to the support tube 7 and the slider tube 5. During compression, the stanchion tube 3 enters the slider tube 5 against the force of the spring 10 and compresses the spring 10. This means that the stanchion tube 2 enters deeper into the slider tube 5 during compression.

The linear travel measurement apparatus 20 for a compression travel x of the telescopic spring unit 1 comprises the electrically conductive spring 10 which forms a measurement inductance L. The measurement inductance L is dependent on an effective length 1 of the spring 10, wherein the spring 10 has a respective electrical contact 12, 14 at its ends and is connected to a measurement capacitance C and to an evaluation and control unit 22 by means of corresponding electrical connections. Here, the measurement inductance L forms an electrical LC resonant circuit 24 with the measurement capacitance C, the evaluation and control unit 22 measuring the resonant frequency f of said LC resonant circuit 24. The resonant frequency f is given as a function of the compression travel x. In the illustrated exemplary embodiment, the evaluation and control unit 22 calculates a current compression travel x on the basis of the measured resonant frequency f of the LC resonant circuit 24.

In the illustrated exemplary embodiment, the electrically conductive spring 10 acts in principle as a coil, of which the measurement inductance L can be calculated in accordance with equation (1).

$$L = \mu_0 \frac{N^2 A}{l} \tag{1}$$

Figure 4:
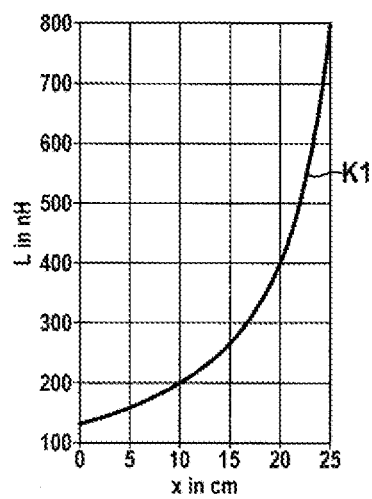
FIG. 4 shows a characteristic curve of the measurement inductance of the linear measurement apparatus from FIGS. 1 to 3 as a function of the compression travel.

Here, $\mu_0$ denotes the magnetic field constant, N denotes the number of turns, A denotes the cross-sectional area and l denotes the effective length of the spring 10 or coil. Apart from the length l, all of the variables remain virtually identical during compression of the corresponding spring 10 and the measurement inductance L increases owing to the compression of the spring 10. As is further shown in FIG. 1, the spring 10, in the no-load state of the telescopic spring unit 1, has a compression travel x with the value 0 and a first effective length l1. In a partially compressed state of the telescopic spring unit 1 illustrated in FIG. 2, the spring 10 has a second effective length l2 which is smaller than the first effective length l1. In the case of typical spring dimensions, the effective first length l1 in the uncompressed state has, for example, a value of approximately 200 mm. The number of turns N has, for example, a value of 10, and the diameter d of the spring 10 has, for example, a value of approximately 20 mm. This results in, for example, a value of approximately 0.13 µH for the measurement inductance L in the no-load state of the telescopic spring unit 1, as is shown in FIG. 4.

As is further shown in FIGS. 1 to 3, components of the telescopic spring unit 1 form the electrical connections and the measurement capacitance C in the illustrated exemplary embodiment. Therefore, the measurement capacitance C is formed as a cylindrical capacitor between two surfaces of the slider tube 5 and of the stanchion tube 3, which surfaces face one another. The measurement capacitance C of the cylindrical capacitor is dependent on an insertion depth T of the stanchion tube 3 in the slider tube 5 and is calculated in accordance with equation (2). Since the effective surface area of the cylindrical capacitor increases during compression, the measurement capacitance C also increases.

$$C = \varepsilon_0 \varepsilon_r \frac{2\pi T}{\ln \frac{r_a}{r_i}} \tag{2}$$

Here, $\varepsilon_0$ denotes the electrical field constant, $\varepsilon_r$ denotes the relative permittivity, $r_a$ denotes the internal radius of the slider tube 5, $r_i$ denotes the external radius of the stanchion tube 3 and T denotes the effective insertion depth of the stanchion tube 3 in the slider tube 5. Apart from the insertion depth T, all of the variables remain virtually identical during compression of the telescopic spring unit 1 and the measurement inductance C increases owing to the compression of the telescopic spring unit 1.

Figure 5:
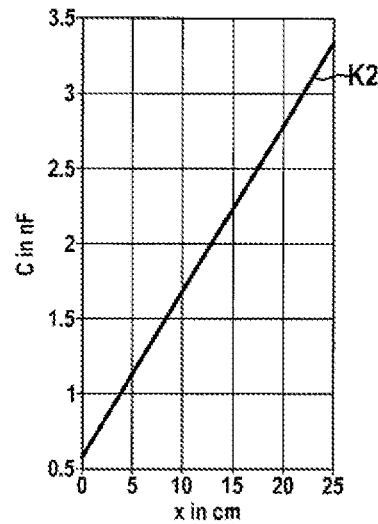
FIG. 5 shows a characteristic curve of the measurement capacitance of the linear measurement apparatus from FIGS. 1 to 3 as a function of the compression travel.

As is further shown in FIG. 1, a first effective insertion depth T1 results in the no-load state of the telescopic spring unit 1, and a second effective insertion depth T2 results in a partially compressed state illustrated in FIG. 2, said second effective insertion depth T2 being greater than the first effective insertion depth T1. In the case of typical dimensions of the telescopic spring unit 1, the effective first insertion depth T1 has, for example, a value of 50 mm in the uncompressed state of the telescopic spring unit 1. The external radius $r_i$ of the stanchion tube 3 has, for example, a value of 10 mm, and the internal radius $r_a$ of the slider tube 5 has, for example, a value of approximately 12 mm. This results in, for example, a value of approximately 0.6 nF for the measurement capacitance C in the no-load state of the telescopic spring unit 1, as is shown in FIG. 5.

As is further shown in FIG. 3, the measurement inductance L and the measurement capacitance C together form an electrical LC resonant circuit 24 with a resonant frequency f which can be calculated in accordance with equation (3).

$$f = \frac{1}{2\pi\sqrt{LC}} \quad (3)$$

Figure 6:
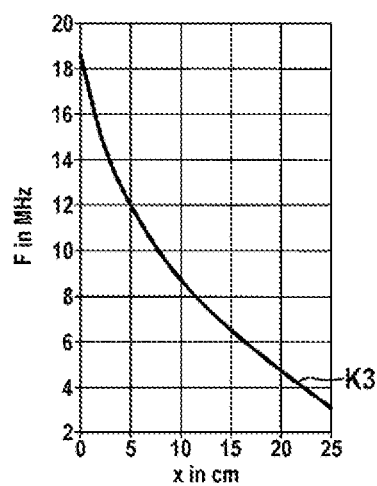
FIG. 6 shows a characteristic curve of the resonant frequency of the linear measurement apparatus from FIGS. 1 to 3 as a function of the compression travel.

Since the measurement inductance L and the measurement capacitance C increase as the compression travel x increases, this results in a high degree of sensitivity with a reduction in the resonant frequency f of several 100 kHz/cm, as is shown in FIG. 6.

In the illustrated exemplary embodiment, the spring 10 is provided, on the surface, with an insulating layer which can be applied, for example, by painting and/or powder coating. At one end, the spring 10 is electrically conductively connected to the stanchion tube 3 by means of a first electrical contact 12. At the other end, the spring is electrically conductively connected to the support tube 7 by means of a second contact 14. The support tube 7 is electrically conductive and is guided by the stanchion tube 3. Therefore, the support tube 7 has an electrically insulating layer 7.2 on a wall which bears against an inner wall of the stanchion tube 3. In addition, the support tube 7 is guided to the outside through an electrically insulated bushing 5.2 in the slider tube 5. The slider tube 5 is likewise electrically conductive. The surfaces of the slider tube 5 and of the stanchion tube 3, which surfaces face one another, are electrically insulated from one another by means of a sealing ring 9. The evaluation and control unit 22 is electrically conductively connected to the slider tube 5 by means of a first contact element 5.1 and is electrically conductively connected to the support tube 7 by means of a second contact element 7.1.

Embodiments of the present disclosure allow a compression travel of a telescopic spring unit to be determined by means of measuring a corresponding resonant frequency. The compression travel can be calculated from the resonant frequency with the aid of a mathematical algorithm. In an advantageous manner, no additional components apart from the electronic components are required for measuring the resonant frequency and for calculating the compression travel.

Exemplary embodiments of the disclosure can be integrated, for example, directly into the telescopic spring unit of the telescopic spring arrangement and used, for example, in motorcycle forks, bicycle forks etc. Information about the current compression travel can be used, for example, for adaptive chassis or for setting the fork stiffness.

What is claimed is:

1. A linear travel measurement apparatus is configured for a compression travel of a telescopic spring unit, the apparatus comprising:
   a spring that is electrically conductive, the spring configured to form a measurement inductance which is dependent on an effective length of the spring,
   wherein the spring has a respective electrical contact at each of its ends and is connected to a measurement capacitance and to an evaluation and control unit by corresponding electrical connections,
   wherein the measurement inductance is configured to form an electrical inductance-capacitance (LC) resonant circuit with the measurement capacitance, the evaluation and control unit measuring the resonant frequency of the LC resonant circuit, and
   wherein the resonant frequency is given as a function of the compression travel.

2. The apparatus according to claim 1, wherein the evaluation and control unit is configured to calculate a current compression travel based on the measured resonant frequency of the LC resonant circuit.

3. The apparatus according to claim 1, wherein components of the telescopic spring unit form at least one of the electrical connections and the measurement capacitance.

4. A telescopic spring unit, comprising:
   a linear travel measurement apparatus for a compression travel;
   a stanchion tube;
   a slider tube;
   a support tube; and
   a spring that is electrically conductive and arranged within the stanchion tube and tensioned between the stanchion tube and the support tube, wherein:
   the stanchion tube is mounted in an axially movable manner with respect to the support tube and the slider tube,
   during compression, the stanchion tube enters the slider tube against the force of the spring and compresses the spring,
   the linear travel measurement apparatus includes the electrically conductive spring, the spring configured to form a measurement inductance which is dependent on an effective length of the spring,
   the spring has a respective electrical contact at each of its ends and is connected to a measurement capacitance and to an evaluation and control unit by corresponding electrical connections,
   the measurement inductance is configured to form an electrical inductance-capacitance (LC) resonant circuit with the measurement capacitance, the evaluation and control unit measuring the resonant frequency of the LC resonant circuit, and
   the resonant frequency is given as a function of the compression travel.

5. The telescopic spring unit according to claim 4, wherein:

the measurement capacitance is formed between two surfaces of the slider tube and of the stanchion tube, the surfaces face one another, and the measurement capacitance is dependent on an insertion depth of the stanchion tube in the slider tube.

6. The telescopic spring unit according to claim 4, wherein the support tube is electrically conductive and is configured to be guided through an electrically insulated bushing in the slider tube.

7. The telescopic spring unit according to claim 4, wherein:

the slider tube is electrically conductive, and the surfaces of the slider tube and of the stanchion tube are electrically insulated from one another by a sealing ring.

8. The telescopic spring unit according to claim 4, wherein the stanchion tube and the support tube are electrically insulated from one another.

9. The telescopic spring unit according to claim 4, wherein:

the spring is electrically conductively connected to the stanchion tube by a first electrical contact and is electrically conductively connected to the support tube by a second electrical contact.

10. The telescopic spring unit according to claim 9, wherein:

the evaluation and control unit is electrically conductively connected to the slider tube by a first contact element and is electrically conductively connected to the support tube by a second contact element.

11. A telescopic spring unit, comprising:

a slider tube;

a stanchion tube mounted in an axially movable manner within the slider tube;

a spring that is electrically conductive and arranged within the stanchion tube; and an evaluation and control unit, wherein, during compression, the stanchion tube enters the slider tube against the force of the spring and compresses the spring, wherein the slider tube and the stanchion tube are each electrically conductive and cylindrical, the slider tube and the stanchion tube together forming a cylindrical capacitor, wherein the spring is electrically connected to the cylindrical capacitor to form an inductance-capacitance (LC) resonant circuit, the spring forming a measurement inductance for the LC resonant circuit, the cylindrical capacitor forming a measurement capacitance for the LC resonant circuit, wherein the measurement inductance is dependent on an effective length of the spring, wherein the measurement capacitance is dependent on an insertion depth of the stanchion tube in the slider tube, and wherein the evaluation and control unit is operably connected so as to measure a resonant frequency of the LC resonant circuit, the resonant frequency being indicative of compression travel of the spring.

* * * * *